(12) United States Patent
Lichodziejewski et al.

(10) Patent No.: US 7,169,459 B2
(45) Date of Patent: Jan. 30, 2007

(54) COLLAPSIBLE CELLULAR INSULATION

(75) Inventors: David Lichodziejewski, Fountain Valley, CA (US); Mitchell Thomas, Villa Park, CA (US)

(73) Assignee: L'Garde, Inc., Tustin, CA (US)

( * ) Notice: Subject to any disclaimer, the term of this patent is extended or adjusted under 35 U.S.C. 154(b) by 157 days.

(21) Appl. No.: 10/438,758

(22) Filed: May 15, 2003

(65) Prior Publication Data
US 2004/0005438 A1 Jan. 8, 2004

Related U.S. Application Data

(60) Provisional application No. 60/381,725, filed on May 15, 2002.

(51) Int. Cl.
*B32B 3/20* (2006.01)
*E04C 2/34* (2006.01)
(52) U.S. Cl. ......... 428/188; 428/72; 428/118; 428/178; 52/793.1; 52/793.11
(58) Field of Classification Search ........ 428/72, 428/76, 99, 118, 166, 120, 178, 188; 52/793.1, 52/793.4
See application file for complete search history.

(56) References Cited

U.S. PATENT DOCUMENTS

| | | | | |
|---|---|---|---|---|
| 3,112,532 A | * | 12/1963 | Slowinski | 52/783.17 |
| 3,384,519 A | * | 5/1968 | Froget | 156/65 |
| 3,892,898 A | * | 7/1975 | Yasui | 428/116 |
| 4,388,354 A | * | 6/1983 | Suominen | 428/12 |
| 4,993,846 A | * | 2/1991 | Diamond et al. | 383/127 |
| 5,270,092 A | | 12/1993 | Griffith et al. | |
| 5,306,100 A | * | 4/1994 | Higginbotham | 410/154 |
| 6,067,764 A | * | 5/2000 | Johansen | 52/302.1 |
| 2002/0020142 A1 | * | 2/2002 | Swiszcz et al. | 52/783.1 |

* cited by examiner

*Primary Examiner*—Donald J. Loney
(74) *Attorney, Agent, or Firm*—Knobbe, Martens, Olson & Bear, LLP (57) ABSTRACT

A collapsible cellular insulation panel for use with mobile shelters is provided. The panel comprises first and second outer sheets with a plurality of intermediate thin flexible membranes. The membranes are secured along first and second edges to inner surfaces of the outer sheets. The membranes are attached to adjacent membranes along strips that are parallel to and intermediate the first and second membrane edges. The interconnected membranes form cells that trap insulating air and break up convective currents between the outer sheets. Supported from underneath on a horizontal surface, the membranes lay substantially flat, such that a thickness of the panel substantially equals the sum of the thicknesses of the membranes and outer sheets. The panel is thus well adapted for use with mobile shelters, because it occupies little volume in the collapsed state. A shear stress on the insulation sheet in a direction perpendicular to the first and second membrane edges opens the cells and increases a distance between the outer sheets. The insulation sheet similarly opens when suspended from above in a substantially horizontal configuration.

15 Claims, 11 Drawing Sheets

COLLAPSIBLE CELLULAR INSULATION

RELATED APPLICATION

This application claims priority to provisional application Ser. No. 60/381,725, filed on May 15, 2002, the entire contents of which are hereby expressly incorporated by reference.

BACKGROUND OF THE INVENTION

1. Field of the Invention

The present invention relates to insulation. More particularly, the present collapsible cellular insulation provides compact insulating sheets adapted for use with mobile and temporary shelters.

2. Description of the Related Art

Mobile and temporary shelters are an important asset for today's militaries and humanitarian relief organizations, for example. These shelters are also a common component of many civilian outdoor recreational activities. From large military structures suitable for housing aircraft to two-man pup tents, these shelters are generally easy to erect, tear down, package and transport. However, the attributes that make these shelters easy to transport also make them uncomfortable or impractical to use in extreme climates.

The roofs and walls of conventional mobile shelters are typically nothing more than panels of thin material such as canvas or nylon. These thin materials provide little thermal insulation. Therefore, to make the shelters more energy efficient, and to make them livable in extreme heat or cold, the shelters must employ insulation in combination with an environmental control unit (ECU) that supplies cooling or heat.

Thermal insulation reduces heat transfer. There are three forms of heat transfer: conduction, convection, and radiation.

Conduction: Regions with greater molecular kinetic energy pass their thermal energy to regions with less molecular energy through direct molecular collisions.

Convection: Heat conducted into a static fluid leads to a local volumetric expansion. As a result of gravity-induced pressure gradients, the expanded fluid parcel becomes buoyant and displaces, thereby transporting heat by fluid motion (i.e. convection) in addition to conduction. Such heat-induced fluid motion in initially static fluids is known as free convection. For cases where the fluid is already in motion, heat conducted into the fluid will be transported away chiefly by fluid convection. These cases, known as forced convection, require a pressure gradient to drive the fluid motion, as opposed to a gravity gradient to induce motion through buoyancy.

Radiation: All materials radiate thermal energy in amounts determined by their temperature, where the energy is carried by photons of electromagnetic energy. When temperatures are uniform, the radiative flux between objects is in equilibrium and no net thermal energy is exchanged. The balance is upset when temperatures are not uniform, and thermal energy is transported from surfaces of higher temperature to surfaces of lower temperature. The amount of energy absorption and emission by a particular object depends on the surface emissivity of that object, which is a material property. Low emissivity surfaces emit and absorb less radiation than high emissivity surfaces.

Some types of insulation reduce conduction by providing at least one layer containing very little mass. Conduction can only be eliminated in such a layer by removing all mass from the layer, such as by providing a vacuum layer. A vacuum, however, is difficult to produce and maintain. Some types of insulation provide one or more gas-filled layers, because gases have much lower thermal conductivity than solids or liquids. The insulating ability of such an insulation can be increased by breaking up convection currents within the gas layers.

Conventional insulating materials are foam panels or fiberglass bats, for example. These types of insulation can be affixed to the shelter roof and walls to reduce the transmission of heat through the roof and walls. Unfortunately, these types of insulation are generally quite bulky. They typically occupy a volume that is many times the packaged volume of the structure with which they are used. Storage space is typically very valuable in both military and hiking/camping applications. Therefore, these conventional insulators are generally not practical for use with the majority of mobile shelters.

Large mobile military shelters typically employ ECU's. Rapid heat transfer through the roof and walls of conventional mobile shelters necessitates large capacity ECU's. These units are generally both large and heavy, making them difficult to transport and store. Additionally, ECU's require energy sources to function. Locating and/or transporting energy sources further complicates the use of ECU's with both military and civilian mobile shelters.

U.S. Pat. No. 5,270,092 (the '092 patent) provides a structural or flexible insulating panel. The panel, which may be translucent, is formed from multi-layer polymeric material in the form of an envelope surrounding a baffle. The baffle retards heat transfer across the panel using a material that forms substantially closed spaces. The closed spaces suppress convection of the low conductivity gas fill. At least a portion of the baffle carries a low emissivity surface for suppression of infrared radiation.

To function properly, the panel of the '092 patent must be inflated. This feature makes the panel unsuitable for use with mobile shelters. First, any punctures in the panel compromise the panel's insulating ability. Second, the panel requires an inflation device, which must be transported along with the panel. Such a device is likely to be large and heavy. Furthermore, if the inflation device requires an energy source to operate, the energy source must also be transported, requiring additional storage space and adding extra weight. If the inflation device is manually operated, the inflation process is likely to be time consuming and exhausting. Third, the closed cell structure complicates the packaging and repackaging of the panel.

SUMMARY OF THE INVENTION

The preferred embodiments of the collapsible cellular insulation have several features, no single one of which is solely responsible for their desirable attributes. Without limiting the scope of this collapsible cellular insulation as expressed by the claims that follow, its more prominent features will now be discussed briefly. After considering this discussion, and particularly after reading the section entitled "Detailed Description of the Preferred Embodiments," one will understand how the features of the preferred embodiments provide advantages, which include, excellent insulative performance without the need to maintain an inflation pressure, light weight, and collapsibility into flat sheets for easy transportation and storage.

A preferred embodiment of the collapsible cellular insulation comprises a panel for mobile shelters having excellent insulation performance without the need to maintain an inflation pressure, that is light weight, and that is easily collapsed from an open configuration to a very thin collapsed configuration for easy transportation and storage. The panel comprises a first sheet forming one side of the panel, a second sheet forming an opposite side of the panel, and a plurality of hollow cells located between the first and second sheets. The cells are open to ambient air pressure so as to not require inflation. The air has relatively low thermal conductivity. The cells are formed by a plurality of membranes attached at opposite ends thereof to internal faces of the first and second sheets, and have one or more intermediate portions attached to at least one other adjacent membrane. The membrane ends attached to the first sheet are longitudinally spaced from the opposite membrane ends attached to the second sheet, such that each successive membrane partially overlaps an adjacent membrane. The panel has an open and a collapsed configuration determined by the relative forces applied to the first and second sheets. In the open configuration, the cells are filled with air. In the collapsed configuration, each of the overlapping membranes lie generally parallel to the first and second sheets to occupy a minimal space between the first and second sheets.

Another preferred embodiment of the collapsible cellular insulation comprises a panel having excellent insulation performance, that is light weight and collapsible for easy transportation and storage. The panel comprises a first sheet forming one side of the panel, a second sheet forming an opposite side of the panel, and a plurality of hollow cells located between the first and second sheets. The cells are formed by a plurality of intermittently spaced membranes attached at their opposite ends to internal faces of the first and second sheets. At least some of the membranes have one or more portions attached to at least one other adjacent membrane. The membrane ends attached to the first sheet are longitudinally spaced from the opposite membrane ends attached to the second sheet, such that each successive membrane partially overlaps an adjacent membrane. The panel has an open and a collapsed configuration determined by the relative forces applied to the first and second sheets. In the open configuration, the cells are filled with air. In the collapsed configuration each of the overlapping membranes are generally parallel to the first and second sheets to occupy a minimal space between the first and second sheets.

Another preferred embodiment of the collapsible cellular insulation comprises a first outer sheet, a second outer sheet, and a plurality of flexible membrane sheets sandwiched between the first outer sheet and second outer sheet. Substantially all of the flexible membrane sheets are secured along a first edge to an inner surface of the first outer sheet, and are secured along a second edge opposite the first edge to an inner surface of the second outer sheet. First and second surfaces of the flexible membrane sheets are secured along strips to surfaces of adjacent flexible membrane sheets. The strips are substantially parallel to the first and second edges.

Another preferred embodiment of the collapsible cellular insulation comprises a method of constructing a cellular insulation panel. The method comprises the steps of providing a first outer sheet, providing a second outer sheet, providing a plurality of flexible membrane sheets, securing a first edge of at least one of the flexible membrane sheets to an inner surface of the first outer sheet, securing a second edge of the at least one of the flexible membrane sheets to an inner surface of the second outer sheet, and securing strips of first and second opposing surfaces of the at least one of the flexible membrane sheets to adjacent flexible membrane sheets, the strips being substantially parallel to the first edge and second edge.

Another preferred embodiment of the collapsible cellular insulation comprises a first outer sheet, a second outer sheet, and a plurality of flexible membrane sheets sandwiched between the first outer sheet and second outer sheet. When the panel rests on a horizontal surface, the panel tends to occupy a collapsed configuration in which all membrane sheets substantially occupy planes parallel to the first outer sheet and the second outer sheet. When a shear force is applied in the planes of the first outer sheet and the second outer sheet, the panel tends to move toward a deployed configuration in which a perpendicular distance between the first outer sheet and the second outer sheet increases.

BRIEF DESCRIPTION OF THE DRAWINGS

The preferred embodiments of the collapsible cellular insulation, illustrating its features, will now be discussed in detail. These embodiments depict the novel and non-obvious collapsible cellular insulation shown in the accompanying drawings, which are for illustrative purposes only. These drawings include the following figures, in which like numerals indicate like parts.

DETAILED DESCRIPTION OF THE PREFERRED EMBODIMENTS

Figure 1:
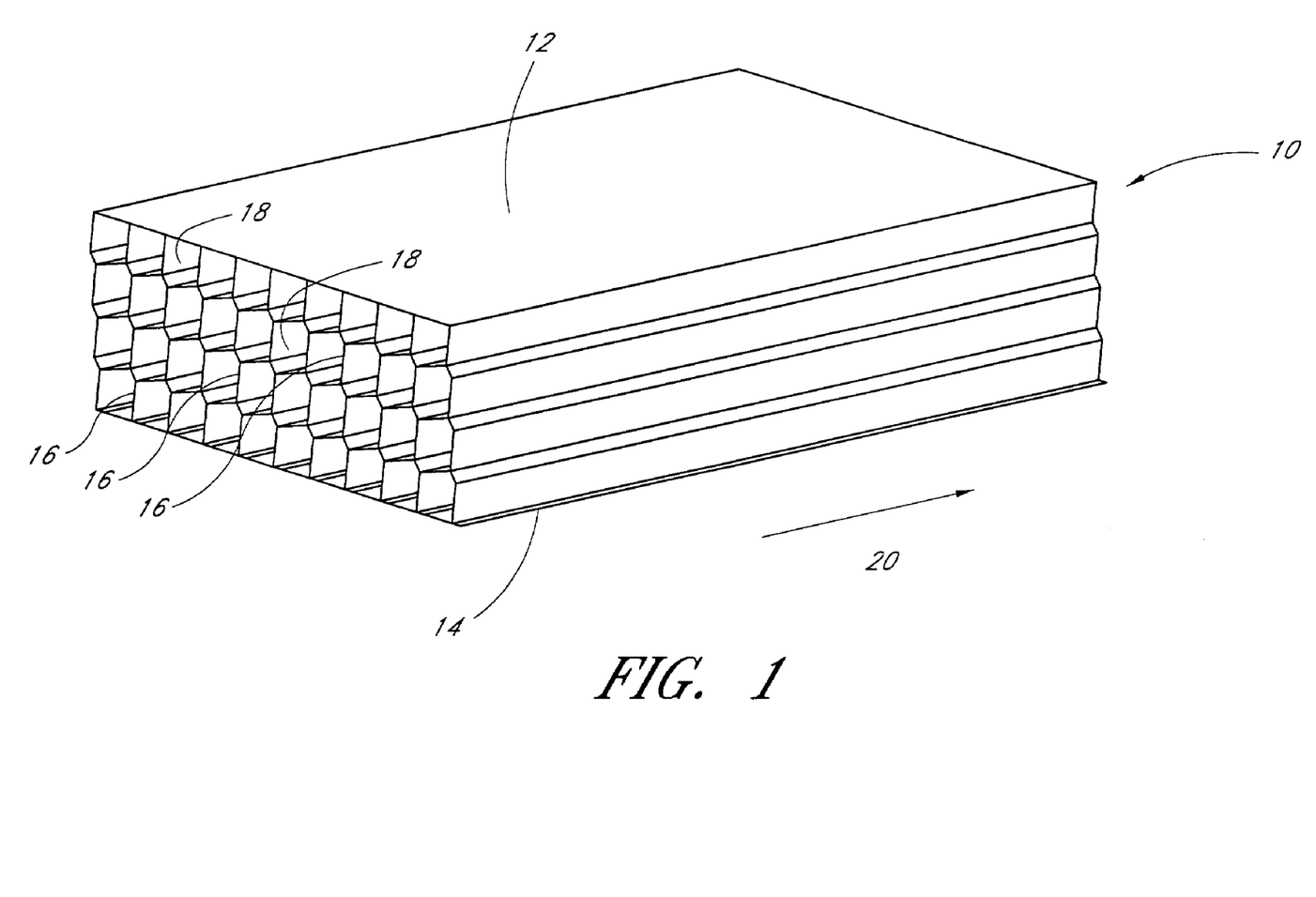
FIG. 1 is a perspective view of a preferred embodiment of a collapsible cellular insulation panel according to the present invention.

FIG. 1 illustrates a preferred embodiment of a panel 10 of the present collapsible cellular insulation. The panel 10 comprises a first outer sheet 12, a second outer sheet 14, and a plurality of thin flexible membranes 16 intermediate the first outer sheet 12 and second outer sheet 14. The membranes 16 form a plurality of cells 18 that contain air. In the illustrated embodiment, each sheet 12, 14 is substantially rectangular in plan aspect. Those of skill in the art will appreciate, however, that the sheets 12, 14 could be any shape.

The sheets 12, 14 are preferably constructed of a lightweight, flexible material. The sheet materials preferably have low thermal conductivity, and are durable enough to withstand prolonged exposure to harsh weather conditions, such as rain and extreme temperatures. The sheet materials may exhibit low gas permeability, so that gas located between the sheets 12, 14 stays between the sheets 12, 14. Trapping gas between the sheets 12, 14 raises the insulating capability of the panel 10. Alternatively, the sheets 12, 14 may exhibit high gas permeability to prevent moisture buildup within the panel 10. Preventing moisture buildup within the panel 10 inhibits mildew growth and the attendant odors. A preferred material for the sheets 12, 14 is vinyl-coated fiberglass fabric. However, those of skill in the art will appreciate that the sheets 12, 14 could be constructed of other materials. If the sheets 12, 14 are constructed of vinyl-coated fiberglass fabric, preferably the sheets 12, 14 have a thickness between about 0.002" and 0.006", and more preferably a thickness between about 0.003" and 0.005". Those of skill in the art will appreciate that the sheets 12, 14 could have other thicknesses.

The membranes 16 are preferably constructed of a lightweight, flexible material. The membrane materials preferably have low thermal conductivity, and low emissivity. Like the sheets 12, 14, the membrane materials may exhibit low or high gas permeability. If the panel 10 desirably has greater insulating capability, then the membrane materials preferably exhibit low gas permeability. If the panel 10 desirably prevents mildew buildup, then the membrane materials preferably exhibit high gas permeability. A preferred material for the membranes 16 is metalized MYLAR®. However, those of skill in the art will appreciate that the membranes 16 could be constructed of other materials. If the membranes 16 are constructed of metalized MYLAR®, preferably the membranes 16 have a thickness between about 0.0003" and 0.0007", and more preferably a thickness between about 0.0004" and 0.0006". Those of skill in the art will appreciate that the membranes 16 could have other thicknesses.

Figure 2:
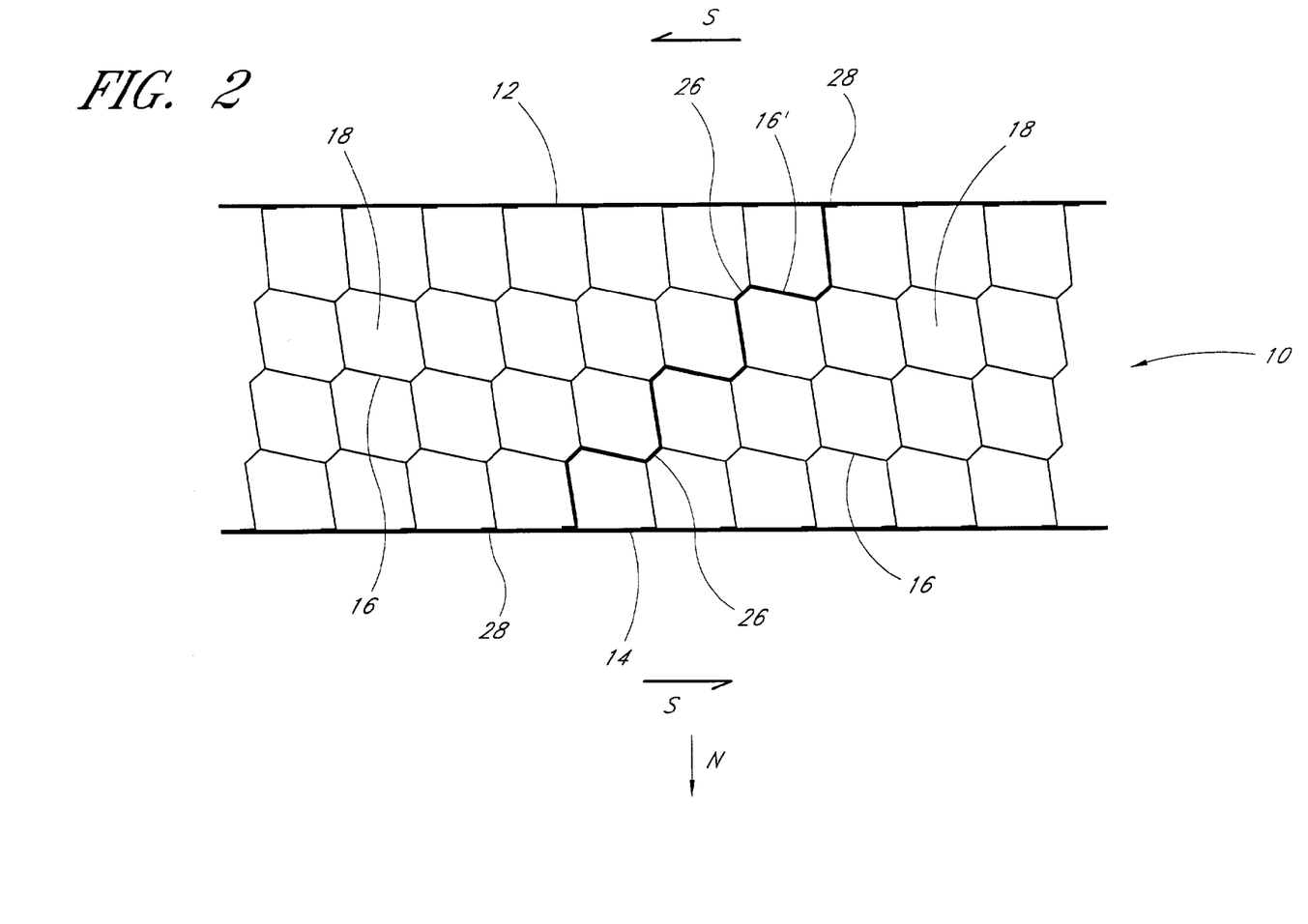
FIG. 2 is an end view of the panel of FIG. 1.
Figure 3:
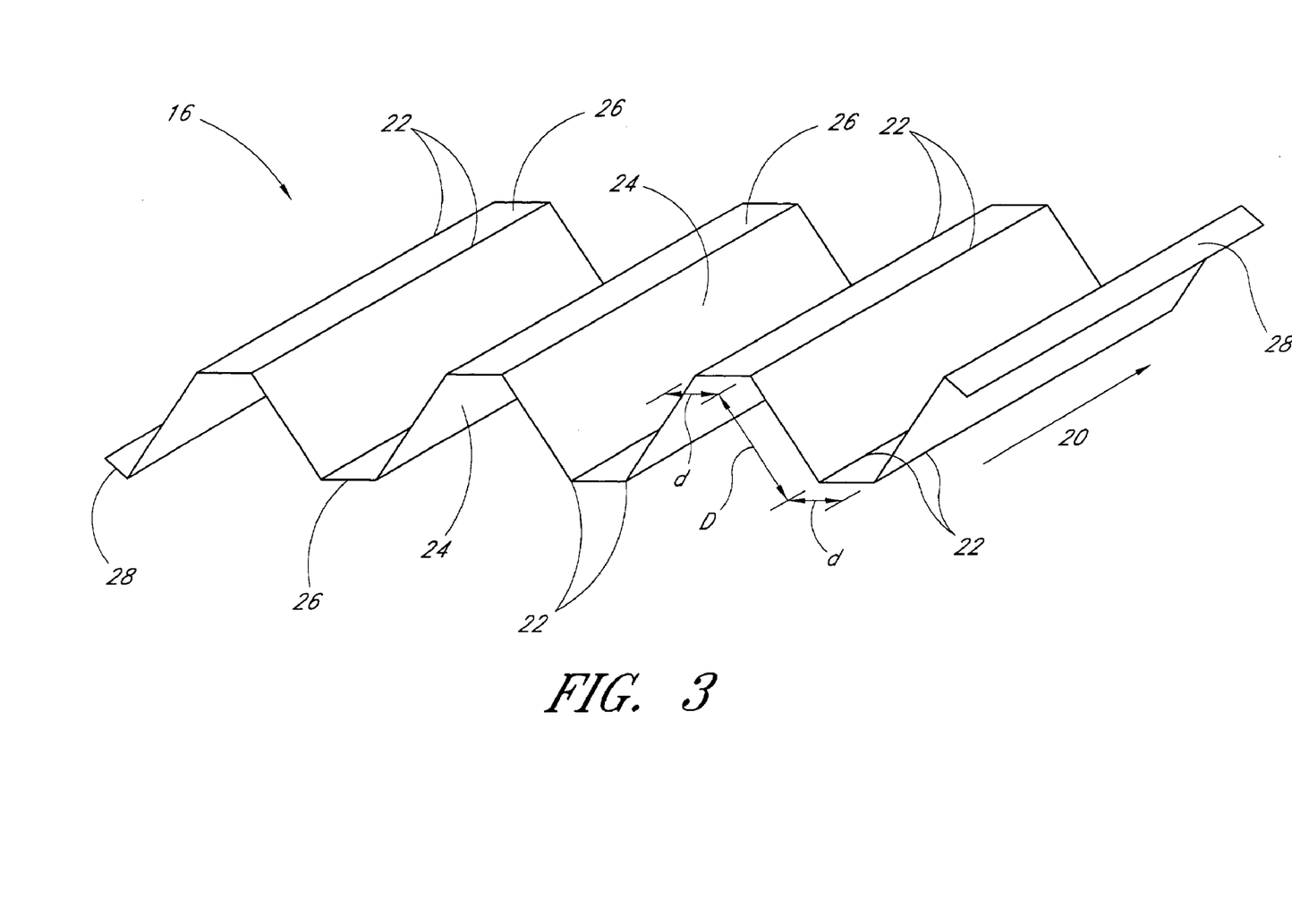
FIG. 3 is a perspective view of a flexible membrane comprising a portion of the panel of FIG. 1.

FIG. 2 illustrates an end view of the panel 10 taken along the axis 20 of FIG. 1. FIG. 2 illustrates the membranes 16 and the cells 18 between adjacent membranes 16. One membrane 16' is illustrated in bold to clarify the configuration of the membranes 16. One membrane 16 is illustrated separately in FIG. 3. In FIG. 3 a length of the membrane 16 along the axis 20 has been shortened for clarity.

Each membrane 16 comprises a folded rectangular sheet of flexible material. The sheet includes a plurality of creases 22, each of which is parallel to the axis 20. The repeating pattern of the creases 22 in a direction perpendicular to the creases is as follows: a first crease 22 having an outside spine on a first surface of the membrane 16, a width d, a second crease 22 having an outside spine on the first surface of the membrane 16, a width D wider than the width d, a first crease 22 having an outside spine on a second surface of the membrane 16, a width d, a second crease 22 having an outside spine on the second surface of the membrane 16, a width D. When viewed along the axis 20, the profile of the membrane 16 forms a repeating pattern of flat-bottomed V's 24, with adjacent V's 24 opening in opposite directions. Flat bottoms 26 of V's 24 form surfaces for attachment to adjacent membranes 16 in the panel 10, as described below. First and second edges of the membrane 16 parallel to the axis 20 include end strips 28 for attachment to the outer sheets 12, 14, as described below.

Those of skill in the art will appreciate that the membranes 16 may be constructed in a variety of alternate ways. For example, the width d need not be shorter than the width D, but could be equal to or longer than the width D. The membrane 16 may also include more or less creases 22, which would result in a panel 10 having more or fewer layers of cells 18, as described below.

Referring to the membrane 16' shown in bold in FIG. 2, the end strip 28 at the first edge of the membrane 16' is secured to an inner surface of the first outer sheet 12, and the end strip 28 at the second edge of the membrane 16' is secured to an inner surface of the second outer sheet 14. The flat surfaces 26 of the membrane 16' intermediate the end strips 28 are secured to flat surfaces 26 of adjacent membranes 16. The surfaces 26 are preferably joined with adhesive strips, but any conventional bonding agent could be used. The interconnected membranes 16, 16' thus form substantially hexagonal cells 18. Except for a few truncated membranes 16 that run along the edges of the panel 10 parallel to the axis 20, every membrane 16, 16' in the panel 10 is connected along the first edge to the first outer sheet 12 and along the second edge to the second outer sheet 14.

In the illustrated embodiment, the cells 18 comprise passages that extend the length of the panel 10 in the direction of the axis 20. Those of skill in the art will appreciate, however, that the cells 18 may be further subdivided along the axis 20 as desired. Further, in the illustrated embodiment, the panel 10 includes four layers of cells 18, measured in the direction perpendicular to each outer sheet 12, 14. Those of skill in the art will appreciate, however, that the panel 10 could include any number of cell layers. Each membrane 16 could be made longer or shorter and each could include a different number of creases 22. The spacing of adjacent creases 22 along the width of each membrane 16 could also be varied to provide cells 18 having varied cross-sectional areas.

Preferably, the cells 18 are not sealed at their ends, and thus contain air at ambient pressure. The panel 10 thus does not require inflation. This property of the panel 10 increases its portability by eliminating the need to transport inflation equipment along with the panel 10. This property also increases the durability of the panel 10, because the insulating performance of the panel 10 is affected only slightly, if at all, by small punctures. Those of skill in the art will appreciate, however, that the cells 18 could be sealed at their ends. Sealed cells 18 could be inflated with air or other gas in order to achieve desired insulation properties.

The air in the cells 18 has relatively low thermal conductivity. Therefore, the majority of heat transferred through the panel 10 by conduction travels along the membranes 16 from one of the outer sheets 12, 14 to the other of the outer sheets 12, 14. As described above, the membranes 16 are preferably constructed from a material or materials having low thermal conductivity. Furthermore, the membranes 16 provide a relatively long path between the outer sheets 12, 14, and the membranes are preferably very thin. Thus, the heat transfer rate through the panel 10 via conduction is very low.

Preferably, the membranes 16 block gas flow. Air molecules in each cell 18 are thus prevented from passing into an adjacent cell 18. The cells 18 thus subdivide the space between the outer sheets 12, 14 and break up convective currents that would otherwise create a relatively high rate of convective heat transfer from one outer sheet 12, 14 to the other outer sheet 12, 14. As the cross-sectional area of the cells 18 decreases, the ability of the cells 18 to disrupt convective currents increases. Therefore, the cells 18 preferably have small cross-sectional areas. In a preferred embodiment, the cells are approximately 0.75 in$^2$ in cross section. Those of skill in the art will appreciate that all cells 18 need not have the same cross-sectional area.

Preferably, the membranes 16 also have low emissivity. Therefore, the rate of radiative heat transfer across each cell 18 is low. The panel 10 thus provides low rates for all three modes of heat transfer, providing excellent insulative capabilities. Insulation performance is often measured by an "R-value per inch", where R is a thermal resistivity, and higher R-values indicate better insulating performance. For example, fiberglass has an R-value per inch of about 3.2° F.-ft$^2$-hr/BTU, while styrene foam has an R-value per inch of about 5° F.-ft$^2$-hr/BTU. Prototypes of the present panel 10 have demonstrated R-values per inch as high as 2.6° F.-ft$^2$-hr/BTU.

Figure 5:
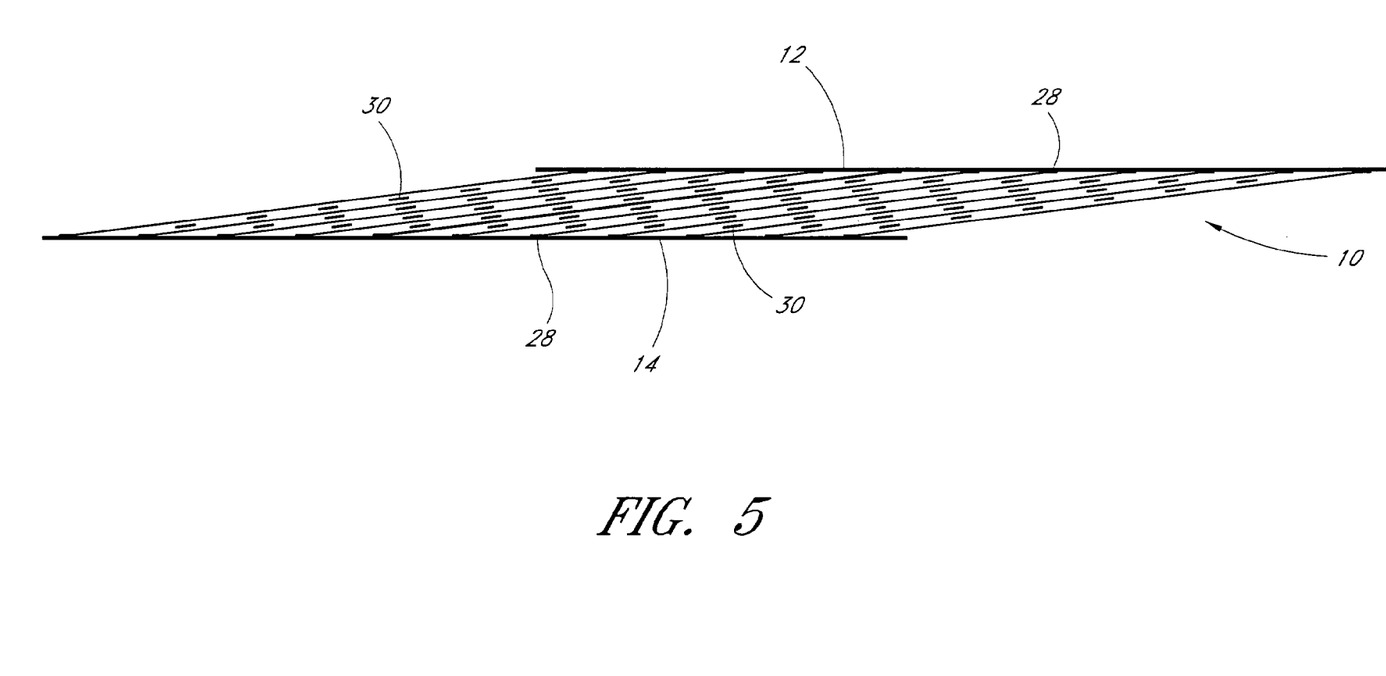
FIG. 5 is an end view of the panel of FIG. 1, illustrating the panel in a completely collapsed configuration.

The panel 10 is preferably constructed flat, as shown schematically in FIG. 5. Separation between successive layers has been exaggerated in FIG. 5 for illustrative purposes. Multiple flat sheets of membrane material 16 are layered on top of the second outer sheet 14, and the first outer sheet 12 is layered on top of the membranes 16. Except for a few truncated membranes 16 that run along the edges of the panel 10 parallel to the axis 20 (FIG. 1), every membrane 16 has the same width. Therefore, each successive membrane 16 partially overlaps the one just underneath it, such that the first edge 28 of the membrane 16 contacts the first outer sheet 12 and the second edge 28 of the membrane 16 contacts the second outer sheet 14, as shown in FIG. 5. Adhesive strips 30 or other suitable bonding agent adheres the end strips 28 to the outer sheets 12, 14, and adheres the surfaces 26 (FIG. 2) to surfaces 26 on adjacent membranes 16.

Advantageously, in a horizontal orientation wherein the panel 10 is supported from underneath, the panel 10 retains the flat configuration of FIG. 5. The panel 10 is easily storable in this configuration. Each of the outer sheets 12, 14 and each membrane 16 is preferably very thin. The flat panel 10 thus occupies very little space. The panel 10 can either be stored flat or rolled up.

Figure 4:
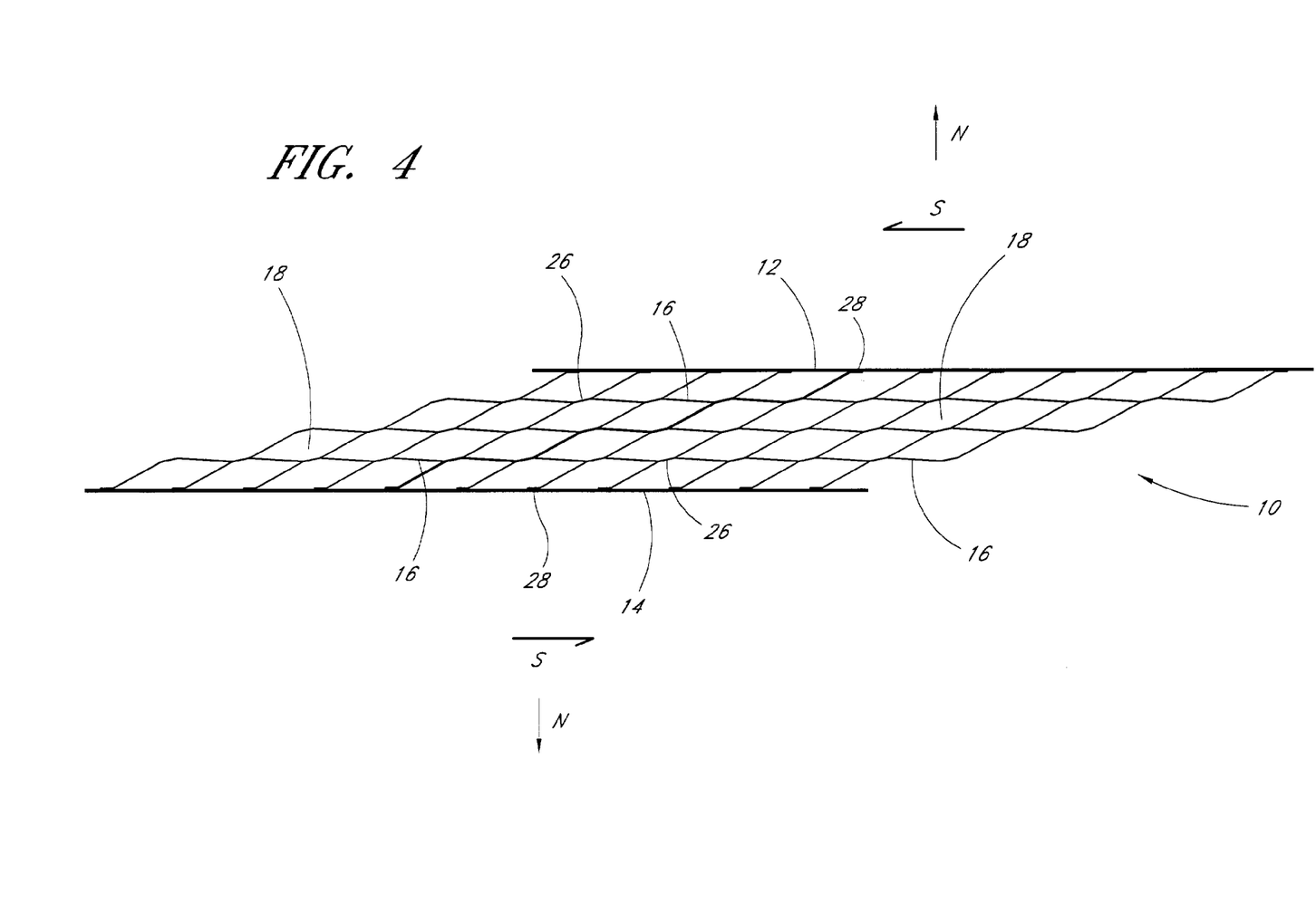
FIG. 4 is an end view of the panel of FIG. 1, illustrating the panel in a partially collapsed configuration.

When a shear force S is applied to the panel 10 as shown in FIGS. 2 and 4, the membranes 16 automatically expand toward the open configuration of FIG. 2. Similarly, when a normal force N in the direction away from the panel 10 is applied to the sheets 12, 14, the membranes 16 automatically expand toward the open configuration of FIG. 2. Advantageously, the membranes 16 prevent the second outer sheet 14 from moving past the first outer sheet 12 in the direction of the shear force S. Thus, the shear force S, or the normal force N, or their combination, tends to hold the panel 10 in the open configuration of FIG. 2. Once the shear force S and the normal force N are removed, the panel 10 collapses back to the flat configuration of FIG. 5.

Gravity applies a shear force S to the panel 10 when one of the sheets 12, 14 is secured to a substantially vertical surface and the remaining sheet 12, 14 hangs freely. Of course, the panel 10 is preferably supported such that the shear force S urges the panel 10 toward the open configuration rather than the flat configuration. Thus, a plurality of panels 10 may be attached to substantially vertical tent walls, for example, to provide insulation for the tent. Gravity would maintain the panels 10 in the open configuration, thus eliminating any need for any apparatus to secure the panels 10 in the open configuration.

For certain applications, such as insulation for a roof, one or more panels 10 is positioned substantially horizontally. In this orientation, if the panel 10 is supported from above, gravity applies a normal force N in the direction of FIGS. 2 and 4. This normal force N holds the panel 10 in the open configuration. However, if the panel 10 is supported from below, gravity applies a normal force in the opposite direction from that of the normal force N in FIGS. 2 and 4. This force collapses the panel 10 to the closed configuration.

Figure 6:
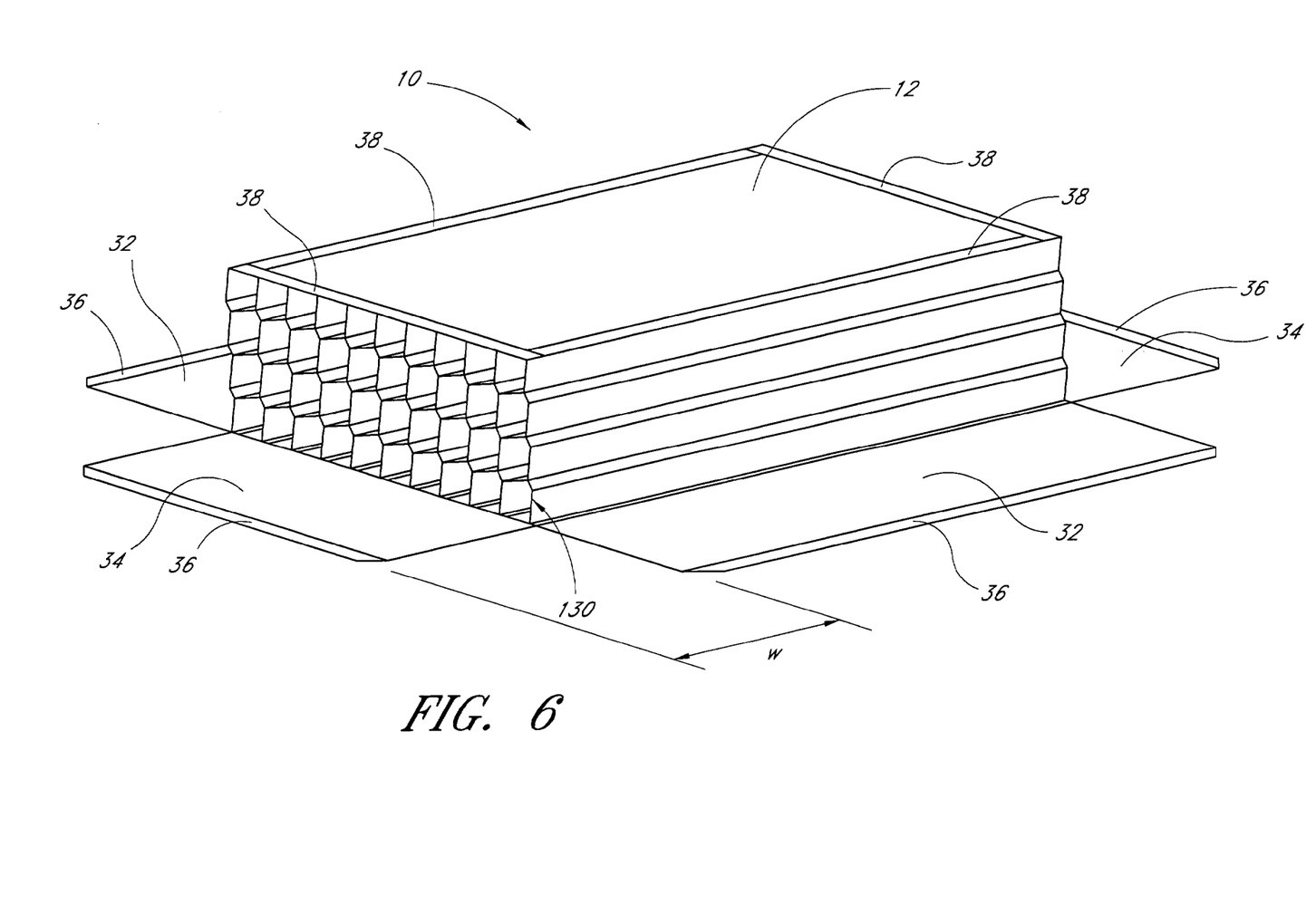
FIG. 6 is a perspective view of the panel of FIG. 1, including side and end caps.
Figure 7:
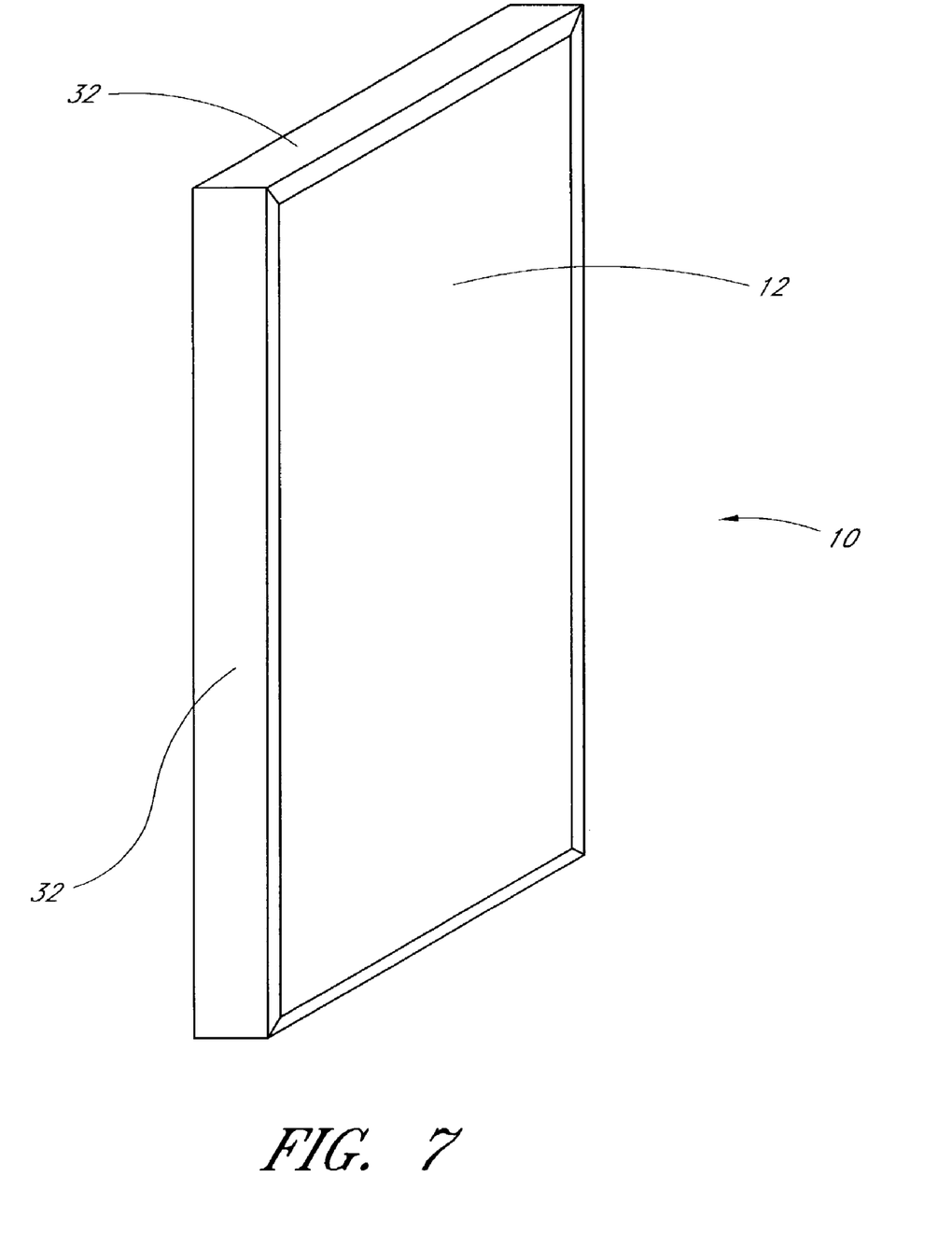
FIG. 7 is a perspective view of the panel of FIG. 6, showing the side and end caps fastened about the sides and ends, respectively, of the panel.

For applications in which the panel 10 is supported such that gravity does not hold the panel 10 in the open configuration, a preferred embodiment of the panel 10 provides side caps 32 and end caps 34 (FIGS. 6 and 7). The caps 32, 34 preferably comprise extensions of the second outer sheet 14. Of course the orientation of the panel 10 could be reversed such that the caps 32, 34 comprise extensions of the first outer sheet 12. Alternatively, the caps 32, 34 could be attached to one of the outer sheets 12, 14 via an adhesive, mechanical fasteners, or hook and loop fastener, for example.

Preferably, a width w (FIG. 6) of the caps 32, 34 is at least as great as a thickness of the panel 10 in the open configuration. The caps 32, 34 are thus foldable around the edges of the panel 10 and reach to the first outer sheet 12. Preferably, the caps 32, 34 are foldable around the edges of the first outer sheet 12 and are releasably secured to the first outer sheet 12, as shown in FIG. 7. For example, the caps 32, 34 may include strips 36 of the hook portion or loop portion of a hook and loop fastener, and the first outer sheet 12 may include strips 38 of the complementary portion of a hook and loop fastener.

The caps 32, 34 resist the natural tendency of the panel 10 to collapse to the flat configuration when supported from beneath by a substantially horizontal surface. The panel 10 of FIG. 7 is thus well adapted for being secured to the outside surface of a tent roof, for example. An outer surface of at least one outer sheet 12, 14 preferably includes a plurality of fasteners 40 for affixing the panel 10 to a surface, such as a tent roof or wall. The fasteners 40 may include, for example, strips of material having hook fastener on one side and loop fastener on the other side, as shown, snaps or adhesive. The fasteners 40 may mate with complementary fasteners on the surface to be insulated. Alternatively, the strips 40 in the illustrated embodiment may wrap around anchors on the surface to be insulated and be secured to themselves.

Figure 11:
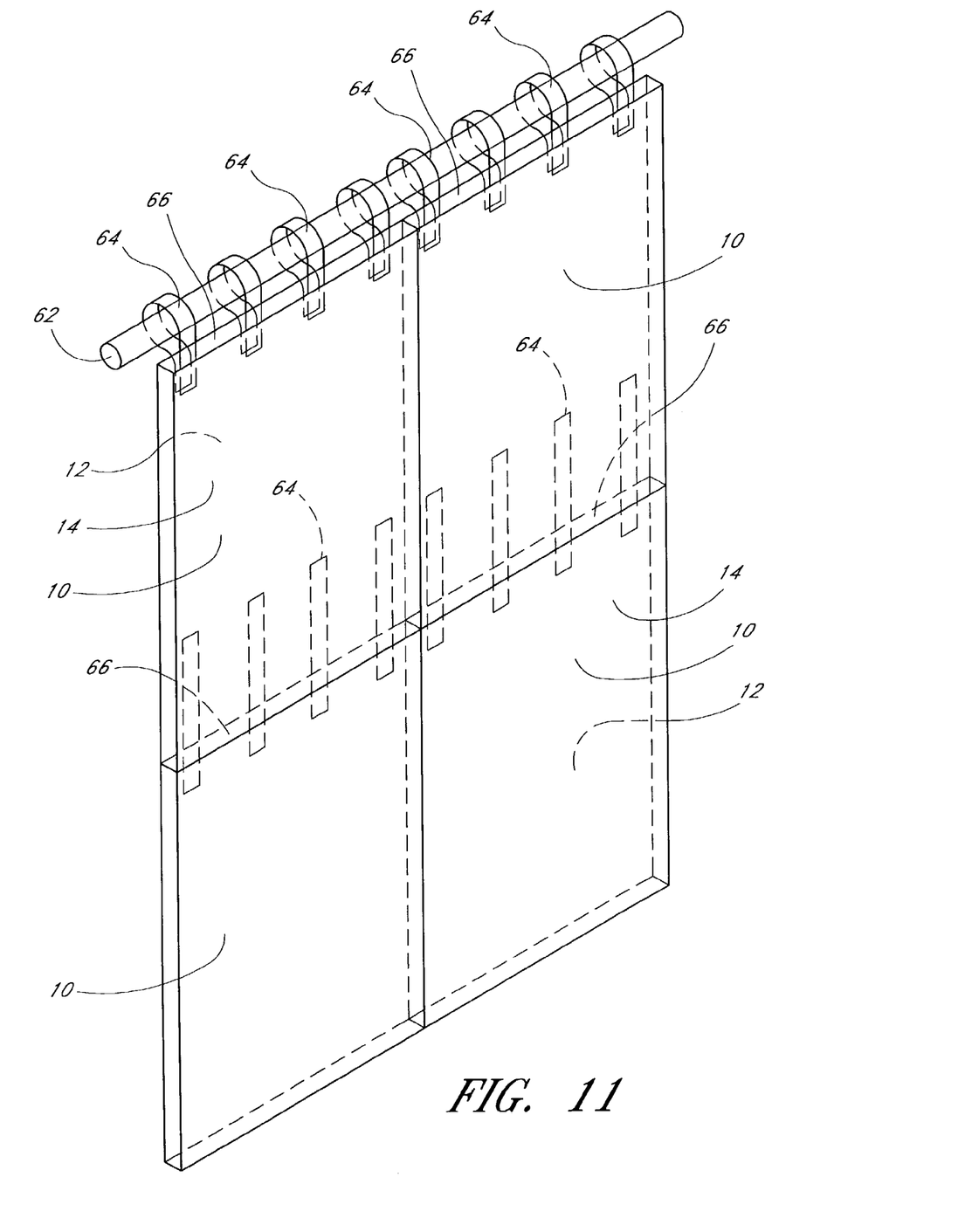
FIG. 11 is a perspective view of four panels similar to the panel of FIG. 1, illustrating a preferred method of using the panels to insulate a vertical tent wall.
Figure 12:
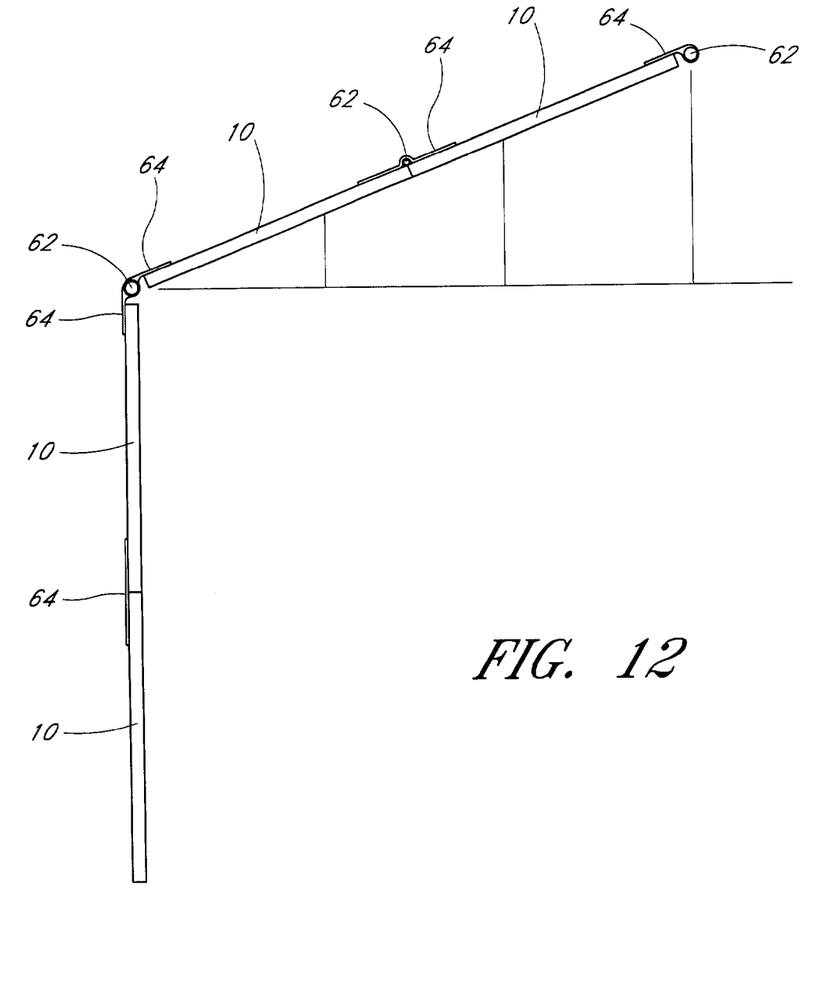
FIG. 12 is a side view of a portion of a tent including panels similar to the panel of FIG. 1, illustrating a preferred method of using the panels to insulate the tent roof and walls.

FIGS. 11 and 12 illustrate a preferred method of using a plurality of panels 10 to insulate a structure such as a tent. Referring to FIG. 11, four panels 10 are illustrated hanging from a substantially horizontal tent support tube 62 in a configuration to insulate a tent wall (not shown). Each panel 10 includes four flexible straps 64 secured to the first outer sheet 12 adjacent a first edge 66. Each strap 64 on the uppermost panels 10 is wrapped around the tent support tube 62 and then secured to itself via a fastener (not shown), such as hook-and-loop fastener, snaps, buttons, etc. Each strap 64 on the lower panels 10 is secured to the first outer sheet 12 of the panel 10 above it. Although four panels 10 are shown, those of skill in the art will appreciate that more or fewer panels 10 may be provided to preferably cover an entire wall. Those of skill in the art will also appreciate that the panels 10 could be of different dimensions as desired.

The panels 10 are oriented such that the cells 18 (not shown in FIG. 11) run parallel to the tent support tube 62. In this orientation, the second outer sheet 14 of each panel 10 hangs freely, because the straps 64 are secured only to the first outer sheet 12. Gravity thus provides the shear force S (FIG. 2) tending to hold the panels 10 in the open configuration. Those of skill in the art will appreciate that the straps could also be attached to the second outer sheet 14 near the edge opposite the first edge 66, and the panels suspended in the opposite orientation from that shown. In this orientation, the first outer sheet 12 would hang freely, such that the shear force S would act in the same direction as in FIG. 11 and hold the panels in the open configuration.

FIG. 12 illustrates a side view of a portion of a structure, such as a tent, that is insulated with a plurality of panels 10. The vertically oriented panels 10 are suspended from the substantially horizontal support tube 62 in the manner shown in FIG. 11. The diagonally oriented panels 10, which insulate a roof (not shown) of the structure, are similarly supported by straps 64 wrapped around support tubes 62 located at opposite ends of the panels 10. The diagonally oriented panels 10 are supported such that gravity provides a normal force tending to hold the panels 10 in the open configuration, as described above.

Figure 8:
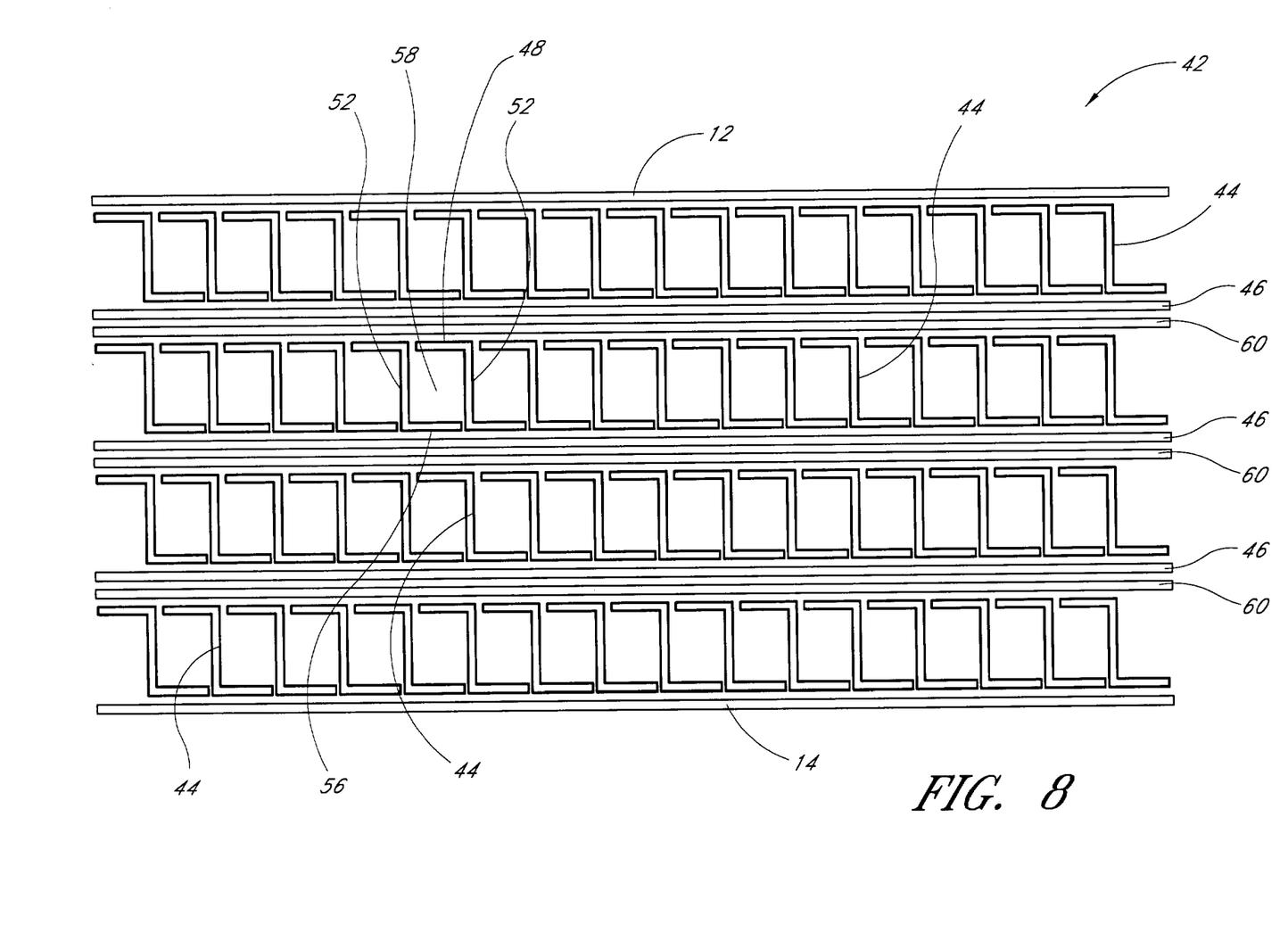
FIG. 8 is an end view of another preferred embodiment of a collapsible cellular insulation panel according to the present invention, including a plurality of the flexible membrane of FIG. 9.
Figure 9:
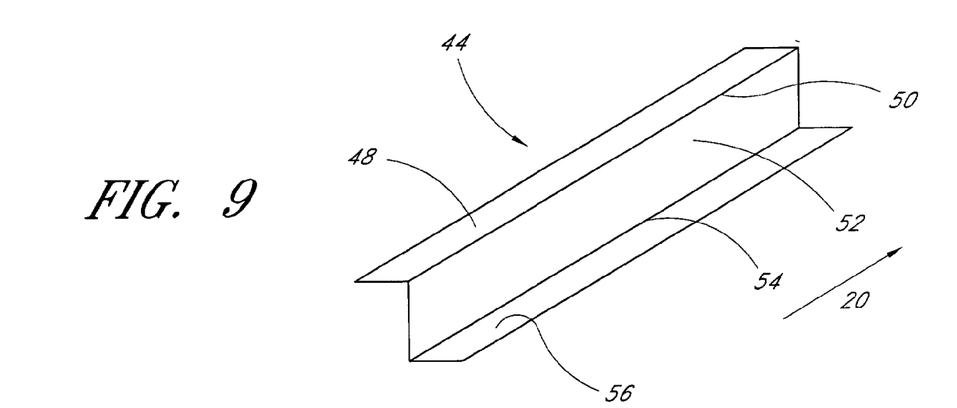
FIG. 9 is a perspective view of a flexible membrane for use in the panel of FIG. 8.
Figure 10:
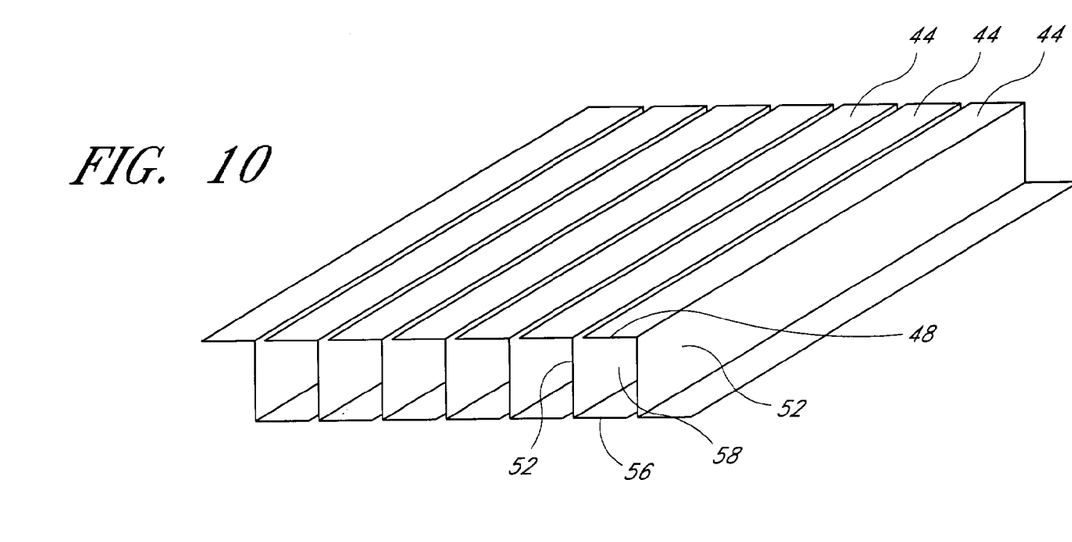
FIG. 10 is a perspective view of a plurality of the flexible membrane of FIG. 9.

FIGS. 8–10 illustrate another preferred embodiment of the panel 42 including an alternately shaped flexible membrane 44. The panel 42 comprises a first outer sheet 12, a second outer sheet 14 opposite the first outer sheet 12, and a plurality of alternating layers of membranes 44 and adhesive sheets 46. The membranes 44, illustrated in isolation in FIG. 9, comprise thin sheets of material folded in a Z. The membranes 44 thus include a first end strip 48, a first crease 50, a span 52, a second crease 54, and a second end strip 56. The creases 50, 54 are substantially parallel to the axis 20. The first and second end strips 48, 56 form contact surfaces for securing the membranes 44 to the outer sheets 12, 14 and the adhesive sheets 46.

In the assembled panel 42, the membranes 42 are arranged side by side in horizontal rows, as shown in FIGS. 8 and 10. The first end strip 48 and span 52 of one membrane 44, and the second end strip 56 and span 52 of an adjacent membrane 44 form a substantially four-sided cell 58. Vertically stacked rows of membranes 44 form the insulation panel 42 schematically illustrated in FIG. 8. The rows membranes 44 are secured to intermediate adhesive sheets 46. Optionally, mesh reinforcement sheets 60 may be secured to the adhesive sheets 46. The reinforcement sheets may comprise, for example, nylon mesh.

The embodiment of the panel 42 depicted in FIGS. 8–10 exhibits advantageous properties similar to those of the panel 10 depicted in FIGS. 1–7. The panel 42 has a high R-value, does not require inflation, is lightweight and is capable of being collapsed into flat sheets for easy transportation and storage.

SCOPE OF THE INVENTION

The above presents a description of the best mode contemplated for carrying out the present collapsible cellular insulation, and of the manner and process of making and using it, in such full, clear, concise, and exact terms as to enable any person skilled in the art to which it pertains to make and use this collapsible cellular insulation. This collapsible cellular insulation is, however, susceptible to modifications and alternate constructions from that discussed above that are fully equivalent. Consequently, this collapsible cellular insulation is not limited to the particular embodiments disclosed. On the contrary, this collapsible cellular insulation covers all modifications and alternate constructions coming within the spirit and scope of the collapsible cellular insulation as generally expressed by the following claims, which particularly point out and distinctly claim the subject matter of the collapsible cellular insulation.

What is claimed is:

1. A collapsible cellular insulation panel for mobile shelters (i) having excellent insulation performance without the need to maintain an inflation pressure, (ii) that is light weight, and (iii) that is easily collapsed from an open configuration to a very thin collapsed configuration for easy transportation and storage, comprising:
    a first sheet forming one side of the panel;
    a second sheet forming an opposite side of the panel;
    a plurality of hollow cells located between the first and second sheets, the cells being open to ambient air pressure so as to not require inflation, the air having relatively low thermal conductivity, the cells being formed by a plurality of membranes attached at opposite ends thereof to internal faces of the first and second sheets, and having one or more intermediate portions attached to at least one other adjacent membrane, the membrane ends attached to the first sheet being longitudinally spaced from the opposite membrane ends attached to the second sheet, such that each successive membrane partially overlaps an adjacent membrane;
    the panel having an open and a collapsed configuration determined by the relative forces applied to the first and second sheets, such that in the open configuration, the cells are filled with air, and in the collapsed configuration, each of the overlapping membranes lie generally parallel to the first and second sheets to occupy a minimal space between the first and second sheets.

2. A collapsible cellular insulation panel (i) having excellent insulation performance, (ii) that is light weight and (iii) collapsible for easy transportation and storage, comprising:
    a first sheet forming one side of the panel;
    a second sheet forming an opposite side of the panel;
    a plurality of hollow cells located between the first and second sheets, the cells being formed by a plurality of intermittently spaced membranes attached at their opposite ends to internal faces of the first and second sheets, at least some of the membranes having one or more portions attached to at least one other adjacent membrane, the membrane ends attached to the first sheet being longitudinally spaced from the opposite membrane ends attached to the second sheet, such that each successive membrane partially overlaps an adjacent membrane;
    the panel having an open and a collapsed configuration determined by the relative forces applied to the first and second sheets; wherein
    in the open configuration, the cells are filled with air, and in the collapsed configuration each of the overlapping membranes are generally parallel to the first and second sheets to occupy a minimal space between the first and second sheets.

3. A cellular insulation panel comprising:
    a first outer sheet;
    a second outer sheet; and
    a plurality of flexible membrane sheets sandwiched between the first outer sheet and second outer sheet, substantially all of the flexible membrane sheets being secured along a first edge to an inner surface of the first outer sheet and being secured along a second edge opposite the first edge to an inner surface of the second outer sheet, first and second surfaces of the flexible membrane sheets being secured along strips thereof to surfaces of adjacent flexible membrane sheets, the strips being substantially parallel to the first and second edges of the flexible membrane sheets.

4. The insulation panel of claim 3, wherein the membrane sheets define cells.

5. The insulation panel of claim 4, wherein the cells are substantially hexagonal when viewed along an axis that is parallel to the first and second edges of the flexible membrane sheets.

6. The insulation panel of claim 4, wherein the cells are not sealed at ends thereof.

7. The insulation panel of claim 3, wherein the outer sheets are constructed of vinyl-coated fiberglass fabric.

8. The insulation panel of claim 7, wherein the outer sheets each have a thickness between about 0.002 inches and 0.006 inches.

9. The insulation panel of claim 3, wherein the membrane sheets are constructed of metalized polyester film.

10. The insulation panel of claim 9, wherein the membrane sheets each have a thickness between about 0.0003 inches and 0.0007 inches.

11. The insulation panel of claim 3, wherein a width of each membrane sheet strip that is secured to an adjacent membrane sheet is less than a distance between adjacent strips on the same membrane sheet.

12. The insulation panel of claim 3, wherein when the panel rests on a horizontal surface, the panel tends to occupy a collapsed configuration in which all membrane sheets substantially occupy planes parallel to the first outer sheet and the second outer sheet, and when a shear force is applied in the planes of the first outer sheet and the second outer sheet, the panel tends to move toward a deployed configuration in which a perpendicular distance between the first outer sheet and the second outer sheet increases.

13. A method of constructing a cellular insulation panel, the method comprising the steps of:
   providing a first outer sheet;
   providing a second outer sheet;
   providing a plurality of flexible membrane sheets;
   securing a first edge of at least one of the flexible membrane sheets to an inner surface of the first outer sheet;
   securing a second edge of the at least one of the flexible membrane sheets to an inner surface of the second outer sheet; and
   securing strips of first and second opposing surfaces of the at least one of the flexible membrane sheets to adjacent flexible membrane sheets, the strips being substantially parallel to the first edge and second edge.

14. The method of claim 13, wherein each of the outer sheets and the flexible membrane sheets is substantially flat.

15. The method of claim 13, wherein the strips are secured to the adjacent flexible membrane sheets using adhesive strips.

* * * * *